United States Patent
Mayer et al.

(10) Patent No.: US 11,428,243 B2
(45) Date of Patent: Aug. 30, 2022

(54) VARIABLE VANE ARRANGEMENT WITH VANE RECEPTACLE INSERT(S)

(71) Applicant: United Technologies Corporation, Farmington, CT (US)

(72) Inventors: Robert R. Mayer, Manchester, CT (US); Peter F. Gero, Portland, CT (US); Tracy A. Propheter-Hinckley, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 197 days.

(21) Appl. No.: 16/564,478

(22) Filed: Sep. 9, 2019

(65) Prior Publication Data

US 2021/0071684 A1 Mar. 11, 2021

(51) Int. Cl.
*F04D 29/56* (2006.01)
*F01D 17/16* (2006.01)

(52) U.S. Cl.
CPC ......... *F04D 29/563* (2013.01); *F01D 17/162* (2013.01); *F05D 2220/30* (2013.01); *F05D 2230/80* (2013.01)

(58) Field of Classification Search
CPC ...... F01D 17/162; F01D 9/041; F04D 29/563; F05D 2220/30; F05D 2230/80; F05D 2230/10; F05D 2260/30; F05D 2260/37; B23P 6/005
See application file for complete search history.

(56) References Cited

U.S. PATENT DOCUMENTS

| | | |
|---|---|---|
| 5,732,468 A | 3/1998 | Galley |
| 6,199,746 B1 | 3/2001 | Dupree |
| 6,370,752 B1 | 4/2002 | Anderson |
| 7,761,990 B2 | 7/2010 | Ellis |
| 9,074,489 B2 * | 7/2015 | Eleftheriou ........... F04D 29/563 |
| 9,273,566 B2 | 3/2016 | Spangler |
| 9,909,435 B2 | 3/2018 | Propheter-Hinckley |
| 9,932,988 B2 | 4/2018 | Maliniak |
| 10,047,629 B2 | 8/2018 | Mccaffrey |
| 10,125,789 B2 | 11/2018 | Maliniak |
| 10,215,048 B2 | 2/2019 | Mccaffrey |

(Continued)

OTHER PUBLICATIONS

EP search report for EP20192959.3 dated Nov. 10, 2020.

*Primary Examiner* — Justin D Seabe
*Assistant Examiner* — Eric A Lange
(74) *Attorney, Agent, or Firm* — Getz Balich LLC (57) ABSTRACT

An assembly is provided for a variable vane arrangement of a turbine engine. A platform extends circumferentially about a centerline and radially relative to the centerline between a first platform side and a second platform side. The platform includes a plurality of variable vane receptacles arranged in an annular array about the axial centerline, which variable vane receptacles include a first variable vane receptacle. The first variable vane receptacle is configured with a recess, a bore and a shelf. The recess extends longitudinally along a variable vane pivot axis into the platform from the first platform side to the shelf. The bore extends longitudinally along the variable vane pivot axis into the platform from the shelf. An insert includes a sleeve and a plate. The sleeve lines at least a portion of the bore. The plate is located within the recess adjacent the shelf.

11 Claims, 11 Drawing Sheets

(56) References Cited

U.S. PATENT DOCUMENTS

| | | | |
|---|---|---|---|
| 2006/0245916 A1 | 11/2006 | Foucher | |
| 2007/0025842 A1* | 2/2007 | Bouru | F04D 29/563 |
| | | | 415/160 |
| 2007/0084906 A1* | 4/2007 | Vargas | B23K 33/004 |
| | | | 228/119 |
| 2008/0193280 A1* | 8/2008 | Addis | F04D 29/526 |
| | | | 415/148 |
| 2011/0110783 A1 | 5/2011 | Addis | |
| 2012/0304646 A1 | 12/2012 | Palmisano | |
| 2014/0234085 A1 | 8/2014 | Maliniak | |

* cited by examiner

VARIABLE VANE ARRANGEMENT WITH VANE RECEPTACLE INSERT(S)

BACKGROUND OF THE DISCLOSURE

1. Technical Field

This disclosure relates generally to a turbine engine and, more particularly, to a variable vane arrangement for the turbine engine.

2. Background Information

A turbine engine may include a variable vane arrangement, for example, in a compressor section of the turbine engine. Such a variable vane arrangement includes an array of variable vanes, where each variable vane may pivot about a pivot axis. During the pivoting of the variable vanes, wear may occur due to rubbing at interfaces between the variable vanes and inner and/or outer platforms of the vane arrangement. Examples of such wear include wearing away portions of the vane platform(s) forming receptacles for the variable vanes. Such wear may result in skewed movement of the variable vanes, additional turbulence through the gas path and/or increased gas leakage. In order to repair this wear, (a) the vane platform(s) may be replaced with new platform(s) or (b) the worn portions of the platform(s) may be built up by, for example, welding. While such repair techniques have various advantages, there is still room in the art for improvement. There is a need in the art therefore for improved methods for repairing worn vane platforms as well as for improved vane platforms configured to accommodate and/or reduce wear thereto.

SUMMARY OF THE DISCLOSURE

According to an aspect of the present disclosure, an assembly is provided for a variable vane arrangement of a turbine engine. This assembly includes a platform and an insert. The platform extends circumferentially about an axial centerline and radially relative to the axial centerline between a first platform side and a second platform side. The platform includes a plurality of variable vane receptacles arranged in an annular array about the axial centerline. The plurality of variable vane receptacles include a first variable vane receptacle. The first variable vane receptacle is configured with a recess, a bore and a shelf. The recess extends longitudinally along a variable vane pivot axis into the platform from the first platform side to the shelf. The bore extends longitudinally along the variable vane pivot axis into the platform from the shelf. The insert includes a sleeve and a plate. The sleeve lines at least a portion of the bore. The plate is located within the recess adjacent the shelf.

According to another aspect of the present disclosure, a method is provided for repairing a variable vane arrangement for a turbine engine. The variable vane arrangement includes a platform and a variable vane. The platform includes a worn receptacle that receives a hub and a shaft of the variable vane. During this method, a worn portion of the platform adjacent the worn receptacle is removed to provide a modified receptacle that includes a recess, a bore and an annular shelf. An insert is disposed in the modified receptacle. The insert includes a sleeve and a plate. The sleeve lines at least a portion of the bore and is configured to receive the shaft. The plate is within the recess and is configured to provide a buffer between the hub and the annular shelf.

According to still another aspect of the present disclosure, a method is provided involving a variable vane arrangement for a turbine engine. The variable vane arrangement includes a platform and a variable vane. During this method, an insert is located in a receptacle of the platform. The insert includes a sleeve and a plate. The receptacle is configured with a recess, a bore and a shelf. The insert is attached to the platform at least through an interference fit between the sleeve and a surface of the bore. The sleeve lines at least a portion of the bore and is configured to receive a shaft of the variable vane. The plate is within the recess and is configured to provide a buffer between the shelf and a hub of the variable vane.

The platform may include a peripheral bore surface that at least partially forms the bore. The insert may be attached to the platform by at least an interference fit between the sleeve and the peripheral bore surface.

The plate may be an annular plate that extends circumferentially around the variable vane pivot axis.

The plate may cover substantially an entirety of the shelf.

The insert may further include a rim. The rim may project longitudinally out from an outer peripheral edge of the plate along the variable vane pivot axis. The rim may extend circumferentially about the variable vane pivot axis.

The rim may extend circumferentially about the variable vane pivot axis between a circumferential first side of the rim and a circumferential second side of the rim. The circumferential first side of the rim may be circumferentially opposite the circumferential second side of the rim.

The rim may extend completely circumferentially around the variable vane pivot axis.

The first variable vane receptacle may be further configured with a notch. The notch may project radially, relative to the variable vane pivot axis, out from the recess into the platform. The notch may extend partially circumferentially about the variable vane pivot axis within the platform. The rim may be nested within the notch.

The platform may be configured from or otherwise include a first material. The insert may be configured from or otherwise include a second material that is different from the first material.

The platform may be configured from or otherwise include a first material. The insert may be configured from or otherwise include a second material that is identical to the first material.

The first platform side may be a radial inner side of the platform.

The assembly may include a variable vane pivotable about the variable vane pivot axis. The variable vane may include an airfoil, a hub and a shaft. The hub may be connected between the airfoil and the shaft and nested within the recess adjacent the plate. The shaft may project into the sleeve along the variable vane pivot axis.

The removing of the worn portion of the platform may include forming a notch in the platform that projects radially, relative to a pivot axis of the variable vane, into the platform from the recess. The disposing of the insert in the modified receptacle may include nesting a rim of the insert within the notch.

The rim may be machined to fit within the notch.

The removing of the worn portion of the platform may include boring out a worn bore of the worn receptacle to provide the bore of the modified receptacle.

The removing of the worn portion of the platform may include planning a worn shelf of the worn receptacle to provide the shelf of the modified receptacle.

The insert may be attached to the platform by an interference fit between the sleeve and a surface of the bore.

The worn portion removed from the platform may be configured from or otherwise include a first material. The insert may be configured from or otherwise include a second material that is different than the first material.

The worn portion removed from the platform may be configured from or otherwise include a first material. The insert may be configured from or otherwise include a second material that is identical to the first material.

The foregoing features and the operation of the invention will become more apparent in light of the following description and the accompanying drawings.

DETAILED DESCRIPTION

Figure 1:
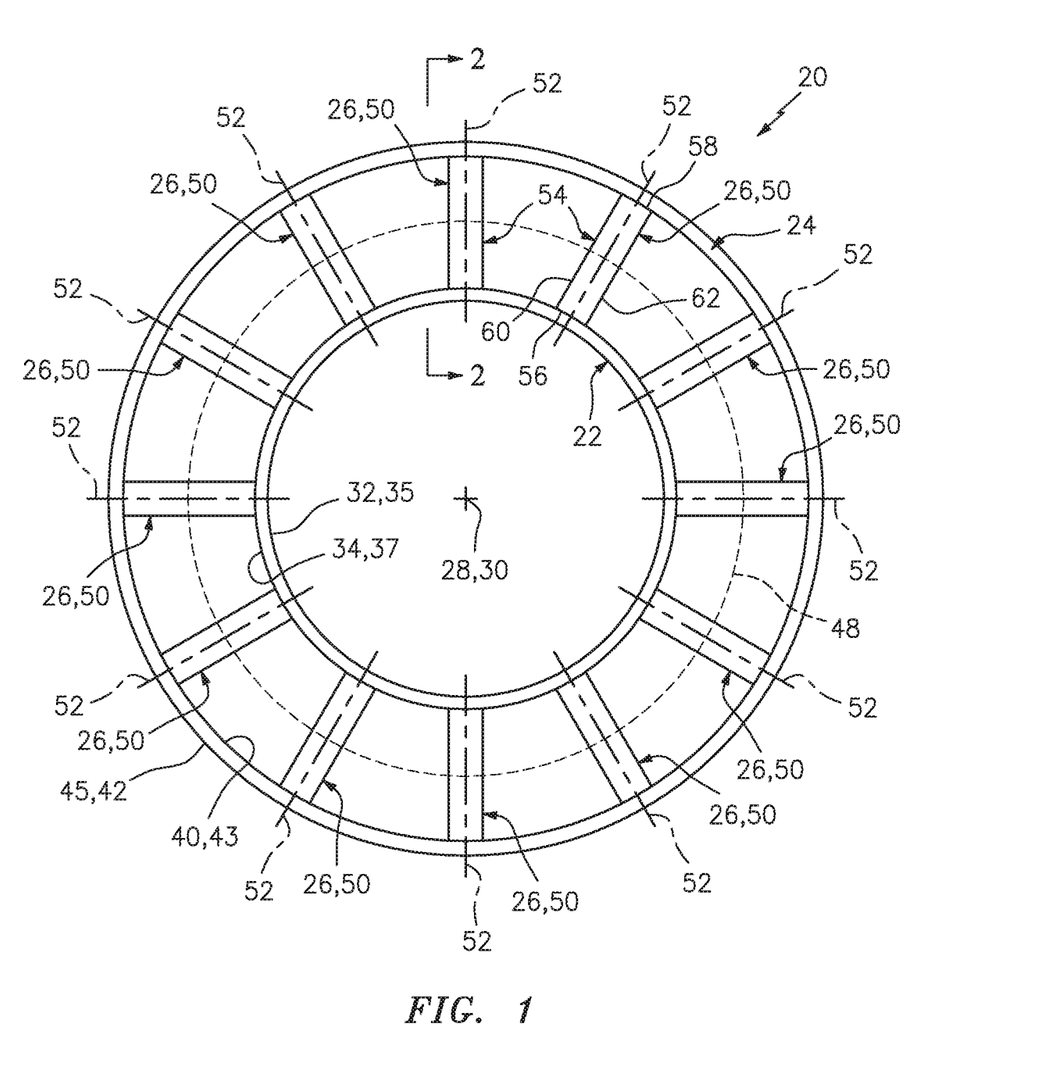
FIG. 1 is an end view illustration of a variable vane arrangement for a turbine engine.

FIG. 1 is a schematic illustration of a variable vane arrangement 20 for a turbine engine. This variable vane arrangement 20 includes a radial inner platform 22, a radial outer platform 24 and a plurality of stator vanes 26.

The inner platform 22 extends circumferentially about an axial centerline 28 of the variable vane arrangement 20, which centerline 28 may be coaxial with an axial centerline 30 of the turbine engine. The inner platform 22 of FIG. 1, for example, extends completely circumferentially around the axial centerline 28, thereby providing the inner platform 22 with a full hoop body. This full hoop body may be a monolithic body; e.g., a single unitary (e.g., unsegmented) body. Alternatively, the full hoop body may be formed from an array of inner platform segments; e.g., an annular array of circumferentially side-by-side (e.g., arcuate) platform segments.

The inner platform 22 extends radially, relative to the axial centerline 28, from an inner platform exterior (e.g., radial inner) side 32 to an inner platform interior (e.g., radial outer) side 34. The inner platform exterior side 32 may be formed by a (e.g., cylindrical or conical) tubular surface 35. The inner platform interior side 34 may also be formed by a generally (e.g., cylindrical or conical) tubular surface 37.

Figure 2:
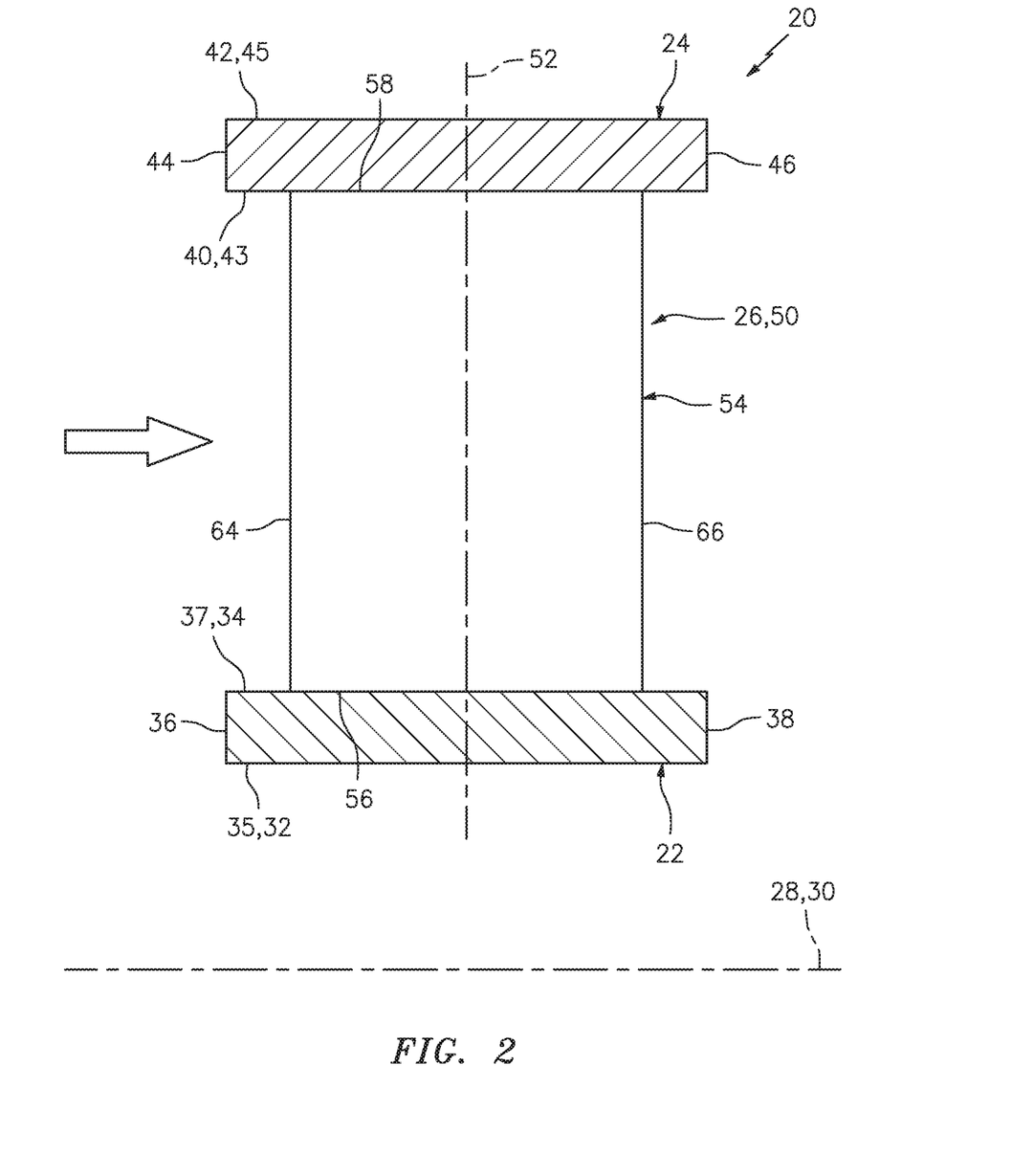
FIG. 2 is a side sectional illustration of the variable vane arrangement taken along line 2-2 in FIG. 1.

Referring to FIG. 2, the inner platform 22 extends axially along the axial centerline 28 from an inner platform (e.g., forward) upstream end 36 to an inner platform (e.g., aft) downstream end 38.

The outer platform 24 of FIG. 1 extends circumferentially about the axial centerline 28. The outer platform 24 of FIG. 1, for example, extends completely circumferentially around the axial centerline 28, thereby providing the outer platform 24 with a full hoop body. This full hoop body may be a monolithic body; e.g., a single unitary (e.g., unsegmented) body. Alternatively, the full hoop body may be formed from an array of outer platform segments; e.g., an annular array of circumferentially side-by-side (e.g., arcuate) platform segments.

The outer platform 24 extends radially, relative to the axial centerline 28, from an outer platform interior (e.g., radial inner) side 40 to an outer platform exterior (e.g., radial outer) side 42. The outer platform interior side 40 may be formed by a (e.g., cylindrical or conical) tubular surface 43. The outer platform exterior side 42 may also be formed by a generally (e.g., cylindrical or conical) tubular surface 45.

Referring to FIG. 2, the outer platform 24 extends axially along the axial centerline 28 from an outer platform (e.g., forward) upstream end 44 to an outer platform (e.g., aft) downstream end 46.

The stator vanes 26 of FIG. 1 are arranged circumferentially about the axial centerline 28 in an annular array. The stator vanes 26 of FIG. 1, for example, are disposed at respective locations along a circular trajectory 48, where each stator vane 26 is circumferentially separated from each neighboring, adjacent stator vane 26 by a respective inter-vane air gap.

The stator vanes 26 are arranged radially, relative to the axial centerline 28, between the inner platform 22 and the outer platform 24. The stator vanes 26 are also coupled to the inner platform 22 and the outer platform 24. For example, as described below in further detail, one or more or each of the stator vanes 26 may be configured as a variable vane 50 that is pivotally coupled to the inner platform 22 and/or the outer platform 24. With such a configuration, each variable vane 50 may pivot about a respective variable vane pivot axis 52 during turbine engine operation. For ease of description, each of the stator vanes 26 is described below as the variable vane 50. However, in other embodiments, one or more of the stator vanes 26 may alternatively be configured as a fixed stator vane or another type of variable vane.

Each of the variable vanes 50 is configured with a variable vane airfoil 54. The vane airfoil 54 extends radially, relative to the axial centerline 28, between an airfoil inner end 56 and an airfoil outer end 58. The airfoil inner end 56 is located at (e.g., on, adjacent or proximate) the inner platform interior side 34 and its surface 37. The airfoil outer end 58 is located at the outer platform interior side 40 and its surface 43.

The vane airfoil 54 extends laterally (e.g., circumferentially or tangentially relative to the axial centerline 28) between an airfoil first side 60 and an airfoil second side 62. One of these sides 60, 62 may be configured as a concave and/or pressure side. The other one of the sides 62, 60 may be configured as a convex and/or suction side.

The vane airfoil 54 of FIG. 2 extends axially along the axial centerline 28 between an (e.g., forward) upstream leading edge 64 and a (e.g., aft) downstream trailing edge 66.

Figure 3:
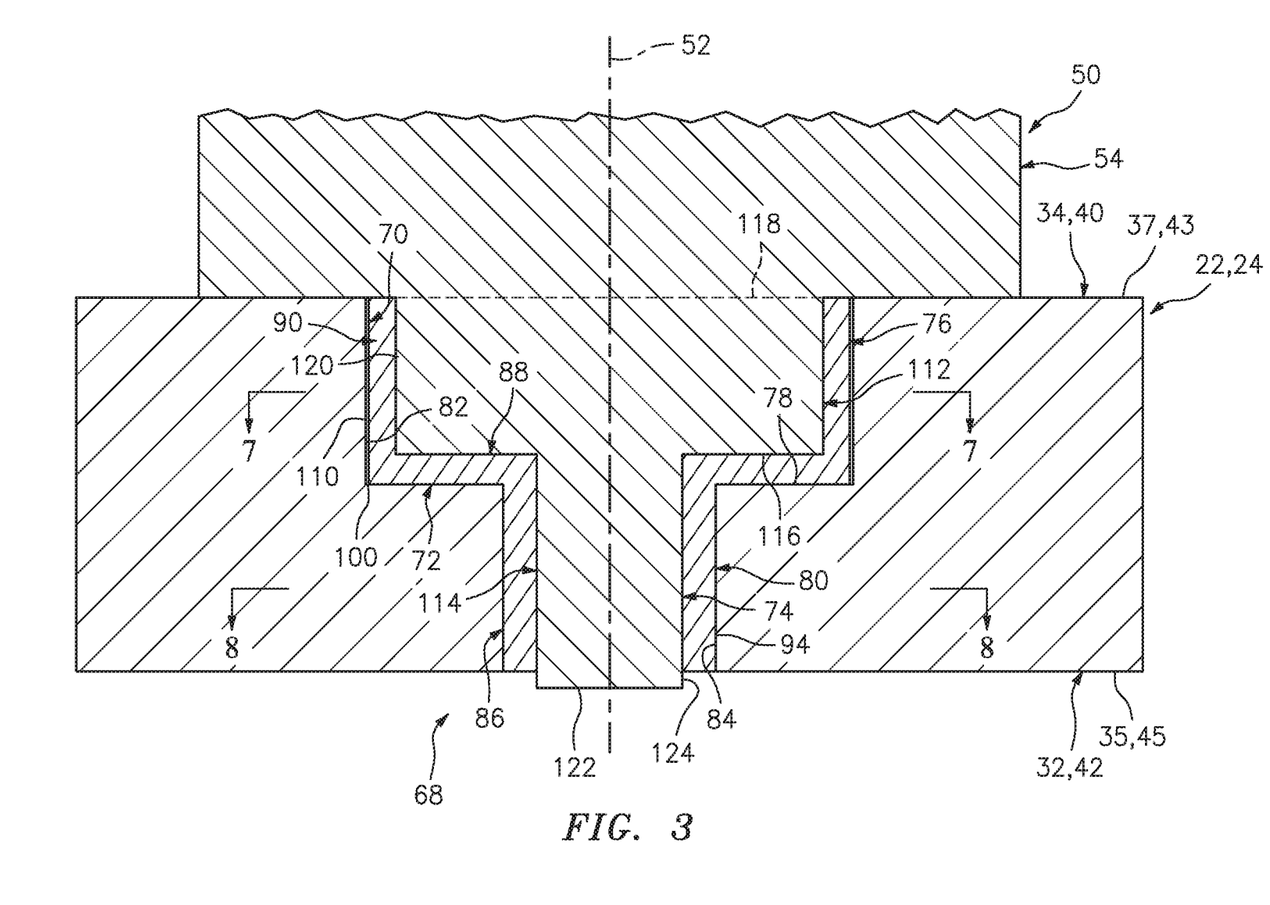
FIG. 3 is a side sectional illustration of a pivot joint between a variable vane and a vane arrangement platform.

Each of the variable vanes 50 may be pivotally coupled to the inner platform 22 and/or the outer platform 24 by a respective pivot joint. An exemplary embodiment of such a pivot joint 68 is illustrated in FIG. 3. This pivot joint 68 includes a variable vane receptacle 70, a receptacle insert 72 and a variable vane coupling 74.

The vane receptacle 70 of FIG. 3 includes a vane receptacle recess 76, a vane receptacle shelf 78 and a vane receptacle bore 80.

Figure 4:
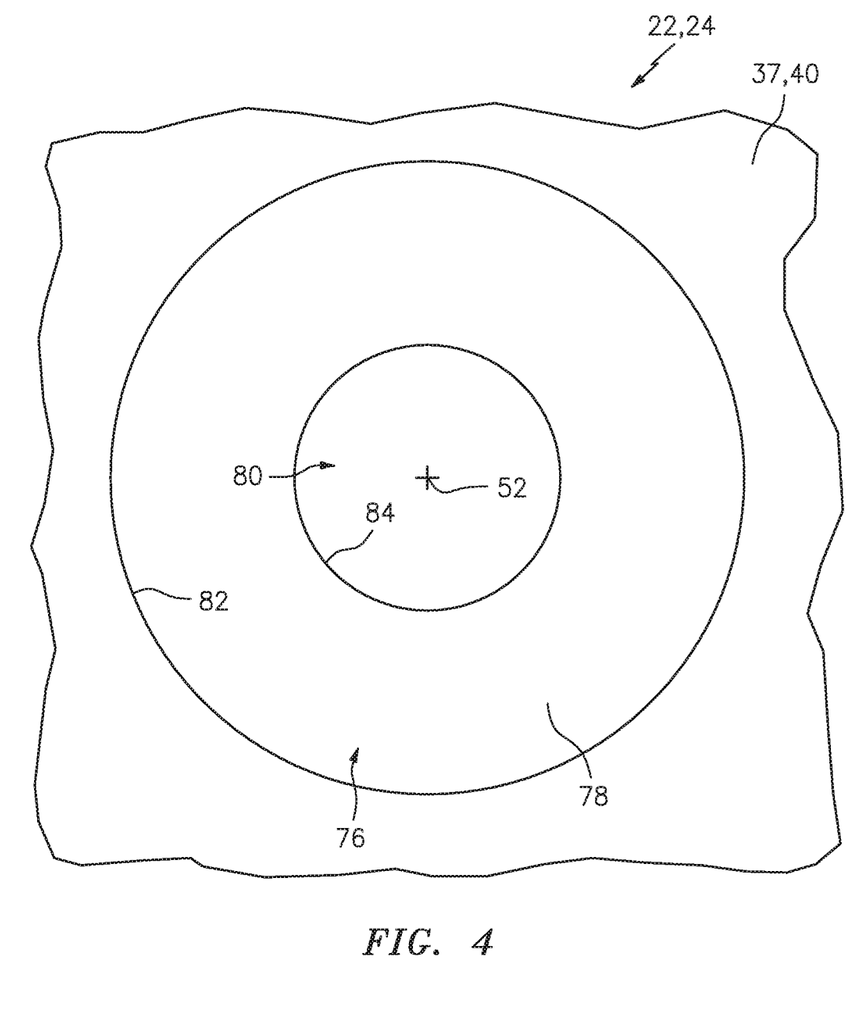
FIG. 4 is a side view illustration of a portion of the vane arrangement platform.

The receptacle recess 76 extends longitudinally along the pivot axis 52 into the platform 22, 24 from the platform interior side 34, 40 and its surface 37, 43 to the receptacle shelf 78. The receptacle recess 76 is formed by at least one outer peripheral recess surface 82. This outer peripheral recess surface 82 may meet (e.g., be contiguous with) the surface 37, 43 at a convex corner. The outer peripheral recess surface 82 may meet (e.g., be contiguous with) an outer shelf edge of the shelf 78 at a concave corner. The outer peripheral recess surface 82 of FIG. 4 extends circumferentially about (e.g., completely around) the pivot axis 52. The outer peripheral recess surface 82 of FIG. 4 may thereby be configured with a circular cross-sectional geometry when viewed in a plane perpendicular to the pivot axis 52; e.g., the plane of FIG. 4.

The receptacle shelf 78 may be configured as an annular surface. The receptacle shelf 78 of FIG. 4, for example, extends circumferentially about (e.g., completely around) the pivot axis 52. The receptacle shelf 78 extends radially, relative to the pivot axis 52, from an inner shelf edge to the outer shelf edge. The inner shelf edge and/or the outer shelf edge may each be configured with a circular cross-sectional geometry when viewed in a plane perpendicular to the pivot axis 52; e.g., the plane of FIG. 4. The receptacle shelf 78 may be configured as a flat planar surface.

Referring to FIG. 3, the receptacle bore 80 extends longitudinally along the pivot axis 52 into the platform 22, 24 from the receptacle shelf 78 towards the platform exterior side 32, 42. In the embodiments of FIG. 3, the receptacle bore 80 extends longitudinally through the platform 22, 24 from the receptacle shelf 78 to the platform exterior side 32, 42 and its surface 35, 45. However, in other embodiments, the receptacle bore 80 may extend partially longitudinally into the platform 22, 24 from the receptacle shelf 78 to a blind end or another shelf. Referring again to the embodiment of FIG. 3, the receptacle bore 80 is formed by at least one outer peripheral bore (e.g., side) surface 84. This outer peripheral bore surface 84 may meet (e.g., be contiguous with) the inner shelf edge of the receptacle shelf 78 at an interior convex corner. The outer peripheral bore surface 84 may meet (e.g., be contiguous with) the surface 35, 45 at an exterior convex corner. The outer peripheral bore surface 84 of FIG. 4 extends circumferentially about (e.g., completely around) the pivot axis 52. The outer peripheral bore surface 84 of FIG. 4 may thereby be configured with a circular cross-sectional geometry when viewed in a plane perpendicular to the pivot axis 52; e.g., the plane of FIG. 4.

Figure 5:
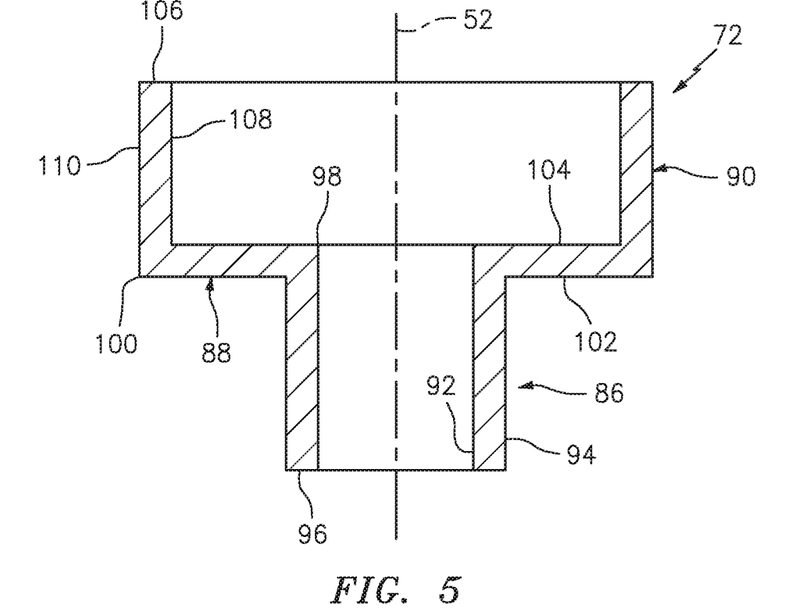
FIG. 5 is a side sectional illustration of a vane receptacle insert taken along line 5-5 in FIG. 6.

Referring to FIG. 5, the receptacle insert 72 includes an insert sleeve 86, an insert plate 88 and an insert rim 90. The insert sleeve 86 may be configured as a tubular body. The insert sleeve 86 of FIG. 6, for example, extends circumferentially about (e.g., completely around) the pivot axis 52. The insert sleeve 86 extends radially, relative to the pivot axis 52, between a sleeve inner surface 92 and a sleeve outer surface 94. Each of these surfaces 92 and 94 may be configured with a circular cross-sectional geometry when viewed in a plane perpendicular to the pivot axis 52; e.g., the plane of FIG. 6. Referring again to FIG. 5, the insert sleeve 86 extends longitudinally along the pivot axis 52 from an exterior end 96 of the receptacle insert 72 to the insert plate 88.

Figure 6:
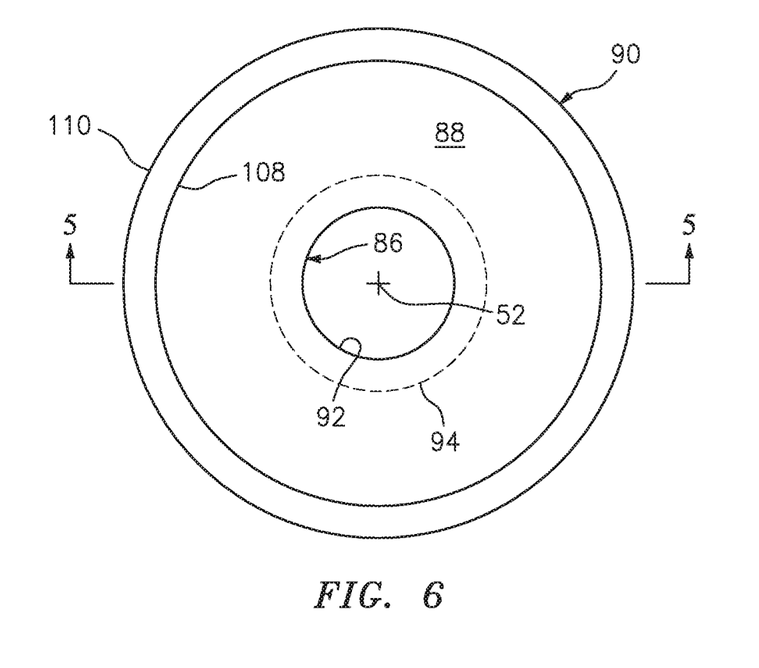
FIG. 6 is a side view illustration of the vane receptacle insert.

The insert plate 88 (e.g., a flange or shelf) is arranged longitudinally along the pivot axis 52 between and connected to (e.g., formed integral with or otherwise bonded to) the insert sleeve 86 and the insert rim 90. For example, the insert plate 88 of FIG. 5 extends radially, relative to the pivot axis 52, between a plate inner peripheral edge 98 and a plate outer peripheral edge 100. The plate inner peripheral edge 98 is connected to the insert sleeve 86 at a first corner. The plate outer peripheral edge 100 is connected to the insert rim 90 at a second corner. The insert plate 88 along extents longitudinally between opposing surfaces 102 and 104. Referring to FIG. 6, each of these surfaces 102 and 104 as well as the plate 88 itself extends circumferentially about (e.g., completely around) the pivot axis 52. Each of the surfaces 102 and 104 may thereby have a circular geometry when viewed in a plane perpendicular to the pivot axis 52; e.g., the plane of FIG. 6. Each of the surfaces 102, 104 may be a flat planar surface.

The insert rim 90 of FIG. 5 projects longitudinally along the pivot axis 52 out from the plate outer peripheral edge 100 to an interior end 106 of the receptacle insert 72; e.g., a distal edge of the insert rim 90. The insert rim 90 extends radially, relative to the pivot axis 52, from a rim inner peripheral surface 108 to a rim outer peripheral surface 110. Referring to FIG. 6, each of these surfaces 108 and 110 as well as the rim 90 itself may extend circumferentially about (e.g., completely around) the pivot axis 52. Each of the surfaces 108 and 110 may thereby have a circular cross-sectional geometry when viewed in a plane perpendicular to the pivot axis 52; e.g., the plane of FIG. 6.

Referring to FIG. 3, the receptacle insert 72 is arranged within the vane receptacle 70. In particular, the insert sleeve 86 is arranged within the receptacle bore 80 such that the insert sleeve 86 lines at least part or all of the receptacle bore 80 and its surface 84. The insert sleeve 86, for example, may extend longitudinally along a length of the receptacle bore 80 such that the insert sleeve 86 covers at least part or all of the outer peripheral bore surface 84. The insert sleeve 86 is attached to the platform via a mechanical attachment. The insert sleeve 86 of FIG. 3, for example, is attached to the platform 22, 24 by at least (or only) an interference fit between the sleeve outer surface 94 and the outer peripheral bore surface 84. This attachment may also be, but is not limited to being, the only attachment between the receptacle insert 72 and the platform 22, 24 securing the entire receptacle insert 72 to the platform 22, 24.

The insert plate 88 is arranged within the receptacle recess 76 adjacent the receptacle shelf 78. The insert plate 88 may thereby line at least part or all of the receptacle shelf 78. The insert plate 88, for example, may extend radially along a width of the receptacle shelf 78 such that the insert plate 88 covers at least part or all of the receptacle shelf 78. However, a slight radial gap may be provided between the plate outer peripheral edge 100 and the outer peripheral recess surface 82. This gap may facilitate installation of the receptacle insert 72 within the vane receptacle 70. The gap may also enable accommodation of thermal growth differences between the receptacle insert 72 and the platform 22, 24. Of course, in other embodiments, the gap may be omitted and the edge 100 may contact the surface 82.

The insert rim 90 is also arranged within the receptacle recess 76 adjacent the outer peripheral recess surface 82. The insert rim 90 may thereby line at least part or all of the outer peripheral recess surface 82. The insert rim 90, for example, may extend longitudinally along a length of the outer peripheral recess surface 82 such that the insert rim 90 covers at least part or all of the outer peripheral recess surface 82. However, a slight radial gap may be provided between the rim outer peripheral surface 110 and the outer peripheral recess surface 82. This gap may facilitate installation of the receptacle insert 72 within the vane receptacle 70. The gap may also enable accommodation of thermal growth differences between the receptacle insert 72 and the platform 22, 24. Of course, in other embodiments, the gap may be omitted and the surface 110 may contact the surface 82.

Figure 7:
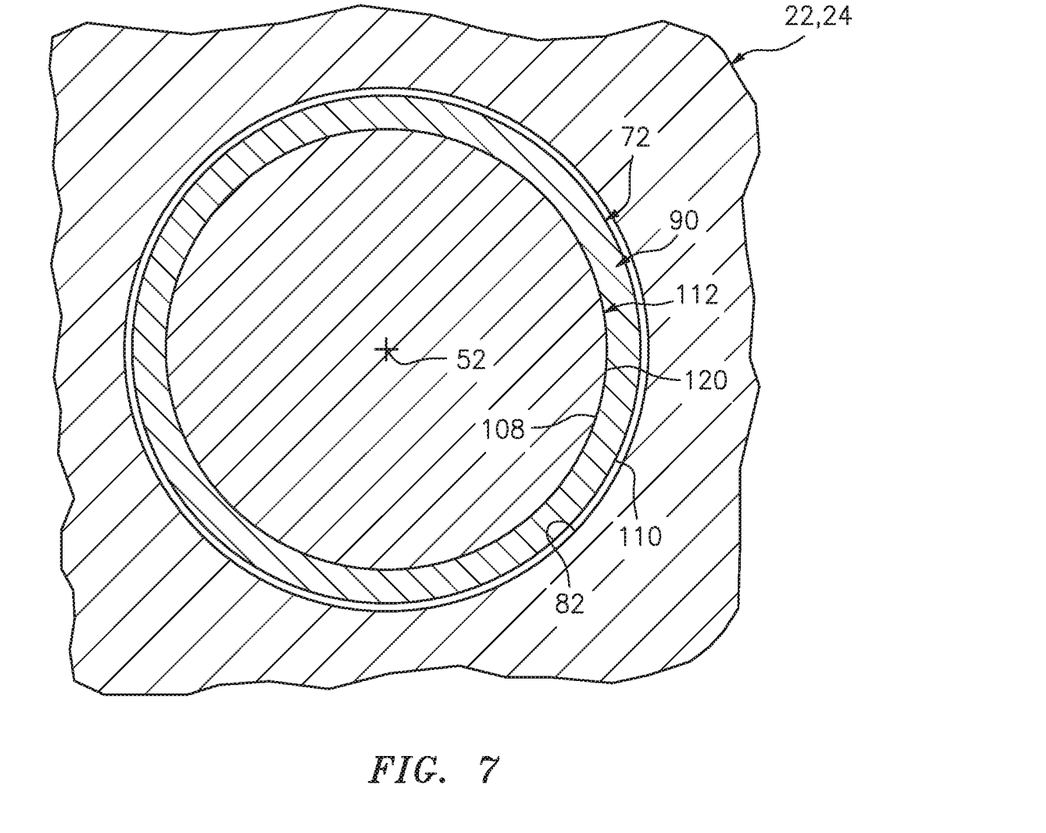
FIG. 7 is a sectional illustration of a portion of the pivot joint taken along line 7-7 in FIG. 3.

The variable vane coupling 74 of FIG. 3 includes a variable vane hub 112 and a variable vane shaft 114. The vane hub 112 is arranged longitudinally, relative to the pivot axis 52, between the vane airfoil 54 and the vane shaft 114. The vane hub 112 of FIG. 3, for example, extends longitudinally between and is connected to (e.g., formed integral with or otherwise bonded to) the vane airfoil 54 and the vane shaft 114. The vane hub 112 of FIG. 3 also extends longitudinally between a hub interior surface 116 and hub exterior surface 118. Referring to FIG. 7, the vane hub 112 projects radially, relative to the pivot axis 52, out to an outer peripheral hub surface 120. This outer peripheral hub surface 120 extends circumferentially about (e.g., completely around) the pivot axis 52. The outer peripheral hub surface 120 may thereby have a circular cross-sectional geometry when viewed in a plane perpendicular to the pivot axis 52; e.g., the plane of FIG. 7.

Referring to FIG. 3, the vane hub 112 is arranged within the vane receptacle 70. More particularly, the vane hub 112 is nested in a cupped recess formed within the receptacle insert 72. The receptacle insert 72 thereby provides a wear buffer/bearing between the vane hub 112 and at least a portion or all of the platform 22, 24. In particular, the insert rim 90 may provide a wear buffer/bearing between the vane hub 112 and the outer peripheral recess surface 82. The insert plate 88 may provide a wear buffer/bearing between the vane hub 112 and the receptacle shelf 78.

Figure 8:
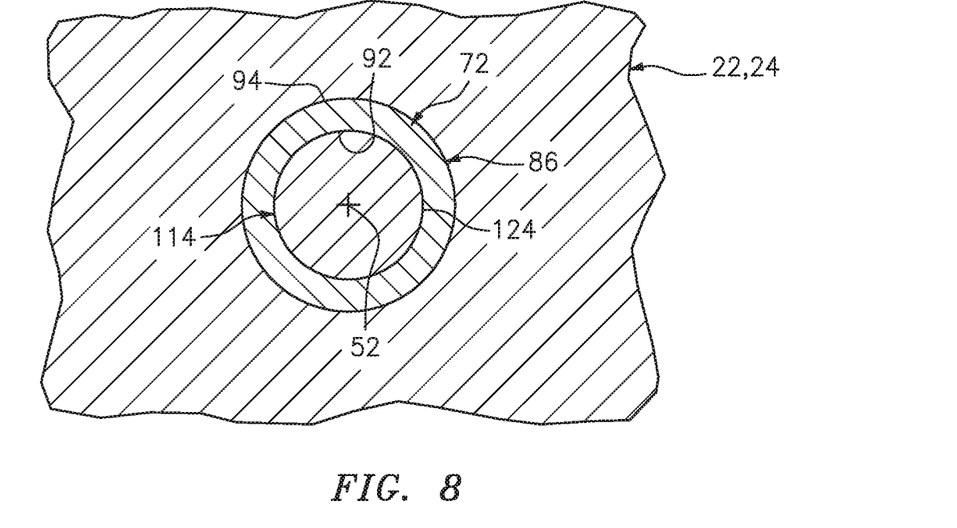
FIG. 8 is a sectional illustration of another portion of the pivot joint taken along line 8-8 in FIG. 3.

The vane shaft 114 of FIG. 3 projects longitudinally along the pivot axis 52 out from the vane hub 112 to a distal shaft end 122, which may be outside (or alternatively inside) the platform 22, 24. The vane shaft 114 projects radially, relative to the pivot axis 52, out to an outer peripheral shaft surface 124. This outer peripheral shaft surface 124, referring to FIG. 8, extends circumferentially about (e.g., completely around) the pivot axis 52. The outer peripheral shaft surface 124 may thereby have a circular cross-sectional geometry when viewed in a plane perpendicular to the pivot axis 52; e.g., the plane of FIG. 8.

Referring again to FIG. 3, the vane shaft 114 is arranged within the vane receptacle 70. More particularly, the vane shaft 114 is nested within and projects longitudinally into (or through) a bore of the insert sleeve 86. The receptacle insert 72 thereby provides a wear buffer/bearing between the vane shaft 114 and at least a portion or all of the platform 22, 24. In particular, the insert sleeve 86 may provide a wear buffer/bearing between the vane shaft 114 and the outer peripheral bore surface 84.

Figure 9:
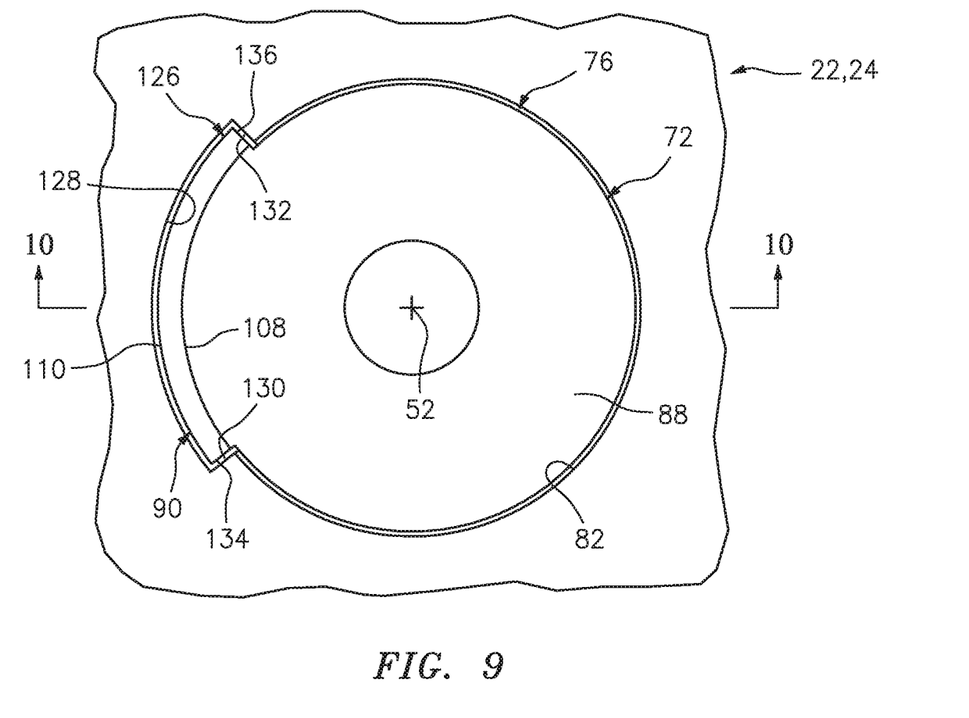
FIG. 9 is a side view illustration of a vane receptacle insert nested in a receptacle of a vane arrangement platform.
Figure 10:
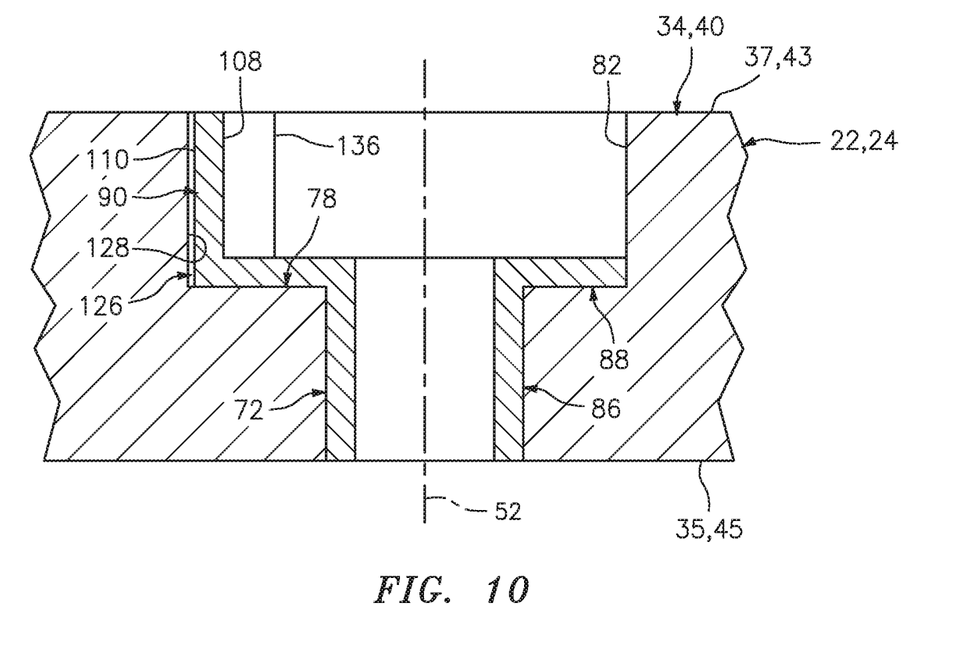
FIG. 10 is a side sectional illustration of the vane receptacle insert and the receptacle taken along line 10-10 in FIG. 9.

In some embodiments, referring to FIG. 9, the vane receptacle 70 may be configured with a vane receptacle notch 126. This receptacle notch 126 extends radially, relative to the pivot axis 52, into the platform 22, 24 from the receptacle recess 76 and its surface 82 to an outer peripheral notch surface 128. The receptacle notch 126 and its surface 128 extends circumferentially about (e.g., partially around) the pivot axis 52 between opposing notch side surfaces 130 and 132. Each of these notch side surfaces 130, 132 extends radially, relative to the pivot axis 52, between and may be contiguous with the surfaces 82 and 128. Referring to FIG. 10, the receptacle notch 126 and each of its surfaces 128, 130 and 132 extends longitudinally along the pivot axis 52 from the platform interior side 34, 40 and its surface 37, 43 to the receptacle shelf 78.

In the embodiments of FIGS. 9 and 10, the insert rim 90 may be configured as an arcuate body, opposed to an annular body as shown in FIG. 6. The insert rim 90 of FIG. 9, for example, extends circumferentially about (e.g., partially around) the pivot axis 52 between opposing rim side surfaces 134 and 136. This insert rim 90 is sized to be nested within the receptacle notch 126. The insert rim 90 may thereby line at least part or all of the outer peripheral notch surface 128. The insert rim 90, for example, may extend circumferentially along a length of the outer peripheral notch surface 128 such that the insert rim 90 covers at least part or all of the outer peripheral notch surface 128. However, slight radial gaps may be provided respectively between the notch side surfaces 134 and 136 and the rim side surfaces 130 and 132. These gaps may facilitate installation of the receptacle insert 72 within the vane receptacle 70. The gaps may also enable accommodation of thermal growth differences between the receptacle insert 72 and the platform 22, 24. Of course, in other embodiments, one or both of the gaps may be omitted and the surfaces 134 and 136 may respectively contact the surfaces 130 and 132.

In the embodiment of FIG. 9, the rim inner peripheral surface 108 may be substantially flush with (e.g., radially aligned with) the outer peripheral recess surface 82. Thus, the rim inner peripheral surface 108 and the outer peripheral recess surface 82 may collectively form a bearing surface for the vane hub 112 (not shown in FIG. 9).

In some embodiments, the receptacle insert 72 may be constructed from or otherwise include a first material; e.g., metal. The platform 22, 24 may be constructed from or otherwise include a second material; e.g., metal. The first material may be different than the second material where, for example, the first material is selected to be more durable, less durable, and/or less expensive than the second material. The first material may be selected to be more durable than the second material so as to provide, for example, a hard coating for the platform 22, 24. The first material may be selected to be less durable than the second material such that, for example, the receptable insert 72 wears before the variable vane hub 112 and/or shaft 114. Alternatively, the first material may be identical to the second material.

Figure 11:
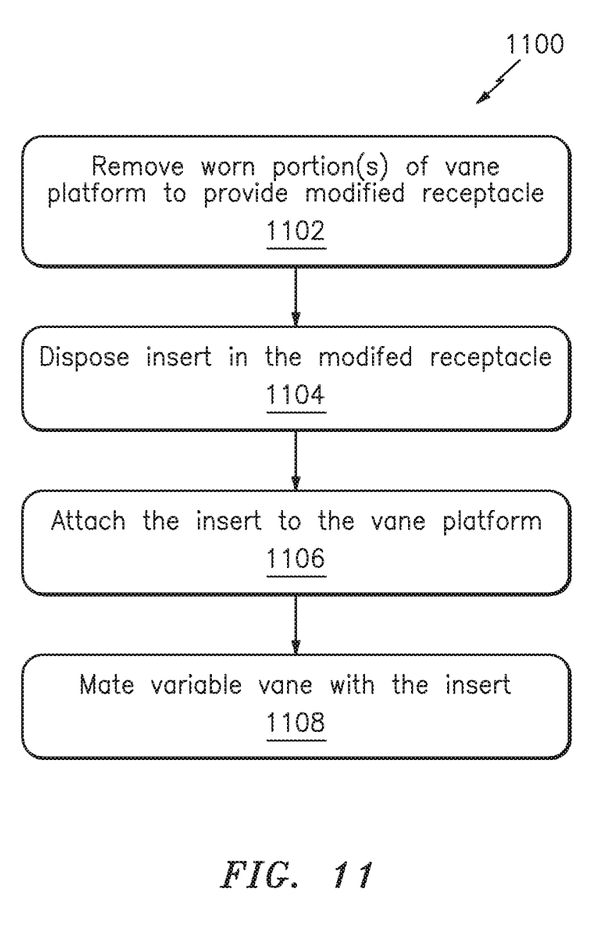
FIG. 11 is a flow diagram of a method involving a variable vane arrangement.

FIG. 11 is a flow diagram of a method 1100 involving (e.g., for repairing) a variable vane arrangement for a turbine engine. This vane arrangement may generally have the same configuration as the vane arrangement 20 shown in FIG. 1. For example, the vane arrangement may include a plurality of vane platforms and a plurality of variable vanes, which variable vanes are arranged in an annular array radially between and pivotally coupled to the vane platforms.

Figure 12:
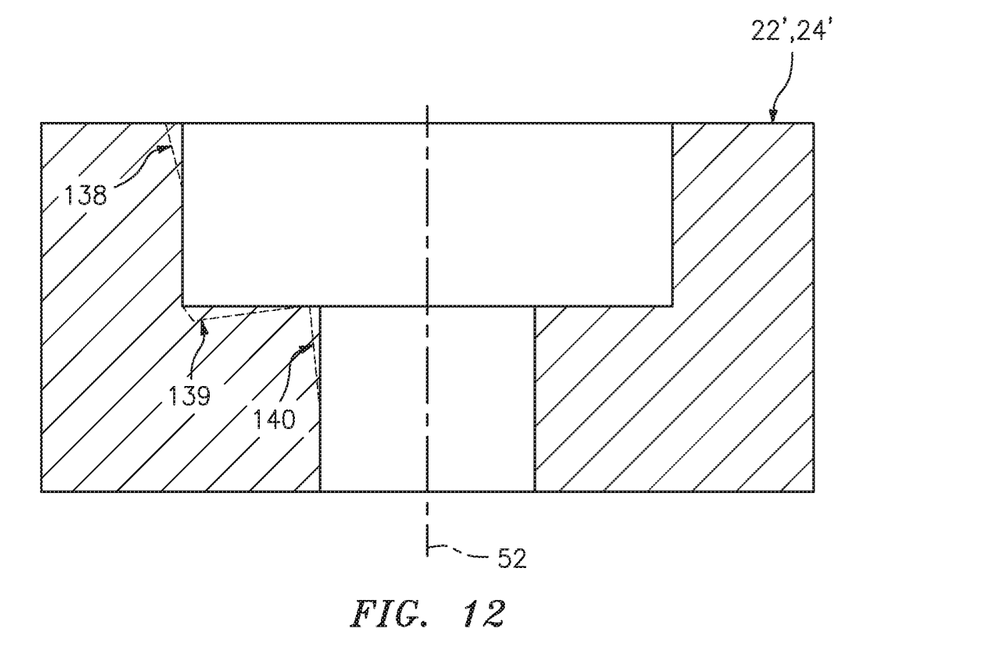
FIG. 12 is a side sectional illustration of a vane arrangement platform depicted with worn portions in dashed lines.
Figure 13:
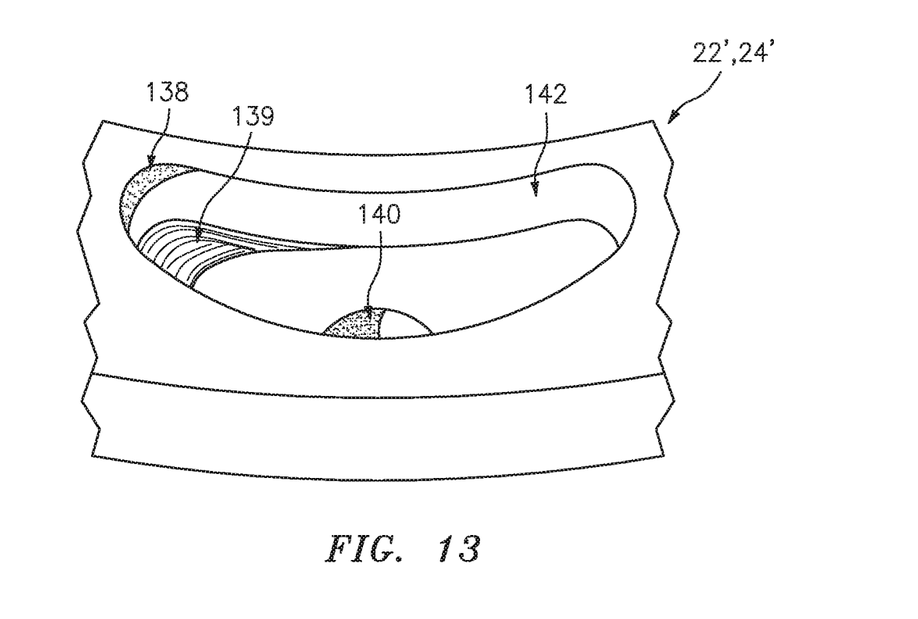
FIG. 13 is a perspective illustration of the vane arrangement platform and its worn portions.

During operation of the turbine engine, the pivoting of the variable vanes (e.g., 50) about their pivot axes (e.g., 52) may wear portions of the platform forming variable vane receptacles. Such wear is exemplified by FIGS. 12 and 13. FIG. 12 illustrates a portion of a vane platform 22', 24' with an unworn variable vane receptacle shown in a solid line and with worn portions 138-140 to the variable vane receptacle shown in dashed lines. FIG. 13 illustrates the vane platform 22', 24' with the worn variable vane receptacle 142.

As exemplified in FIGS. 12 and 13, the vane platform 22', 24' may include at least one worn variable vane receptacle 142. The term "worn variable vane receptacle" may describe a variable vane receptacle that no longer conforms to design specification as a result of rubbing away material defining the receptacle. For example, the worn variable vane receptacle 142 in FIGS. 12 and 13 includes the (e.g., arcuate) worn rim portion 138, the (e.g., a crescent shaped) worn shelf portion 139 and the (e.g., arcuate) worn bore portion 140.

To repair the worn variable vane receptacle 142, one or more of the worn portions 138-140 of the vane platform 22', 24' are removed during step 1102. For example, one or more of the worn portions 138-140 of the platform 22', 24' adjacent the worn variable vane receptacle 142 may be ground down or otherwise machined to provide a vane receptacle configuration as described above and illustrated in, for example, FIGS. 3 and 4 or 9 and 10. The worn rim portion 138, for example, may be machined away to provide the receptacle notch 126; e.g., see FIGS. 9 and 10. The worn shelf portion 139 may be planed to provide the receptacle shelf 78; e.g., see FIGS. 9 and 10. The worn bore portion 140 may be bored (e.g., drilled out) to provide the receptacle bore 80; e.g., see FIGS. 9 and 10. The removal of the worn portions 138-140 may thereby provide a modified variable vane receptacle (e.g., receptacle 70 in FIGS. 3 and 4 or in FIGS. 9 and 10) with the receptacle recess 76, the receptacle bore 80, the receptacle shelf 78, and, in some embodiments, the receptacle notch 126 as described above.

In step 1104, a receptacle insert 72 is disposed in the modified variable vane receptacle (e.g., 70). For example, the receptacle insert 72 is placed in the modified variable vane receptacle such that the insert sleeve 86, the insert plate 88 and the insert rim 90 are nested as described above.

In step 1106, the receptacle insert 72 is attached to the vane platform (e.g., 22, 24). For example, the insert sleeve 86 may be press fit into the receptacle bore 80 such that an interference fit between the insert sleeve 86 and the vane platform secures the receptacle insert 72 to the vane platform.

In step 1108, one of the variable vanes 50 is mated with the now repaired/modified variable vane receptacle to provide the pivot joint 68 of, for example, FIG. 3. For example, the variable vane coupling 74 is inserted into the receptacle insert 72 as described above.

Figure 14:
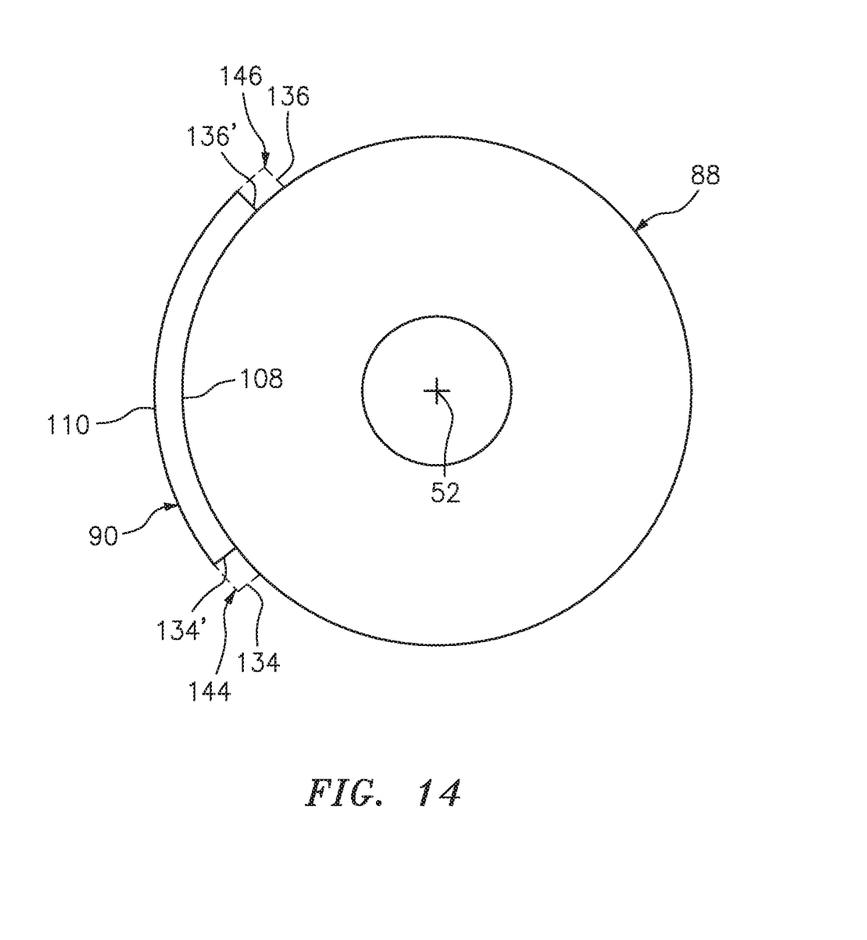
FIG. 14 is a side view illustration of a vane receptacle insert with removed portions shown in dashed lines.

In some embodiments, the insert rim 90 may be machined down in order to minimize the size of the receptacle notch 126. For example, sides 144 and 146 of the receptacle notch 126 may be cut down as illustrated in FIG. 14 to provide modified surfaces 134' and 136'.

In some embodiments, the interference fit between the receptacle insert 72 and the vane platform 22, 24 may be the only attachment between the receptacle insert 72 and the vane platform 22, 24. The present disclosure, however, is not limited to such an exemplary attachment method. For example, in other embodiments, the receptacle insert 72 may also or alternatively be bonded or otherwise attached to the vane platform 22, 24.

Figure 15:
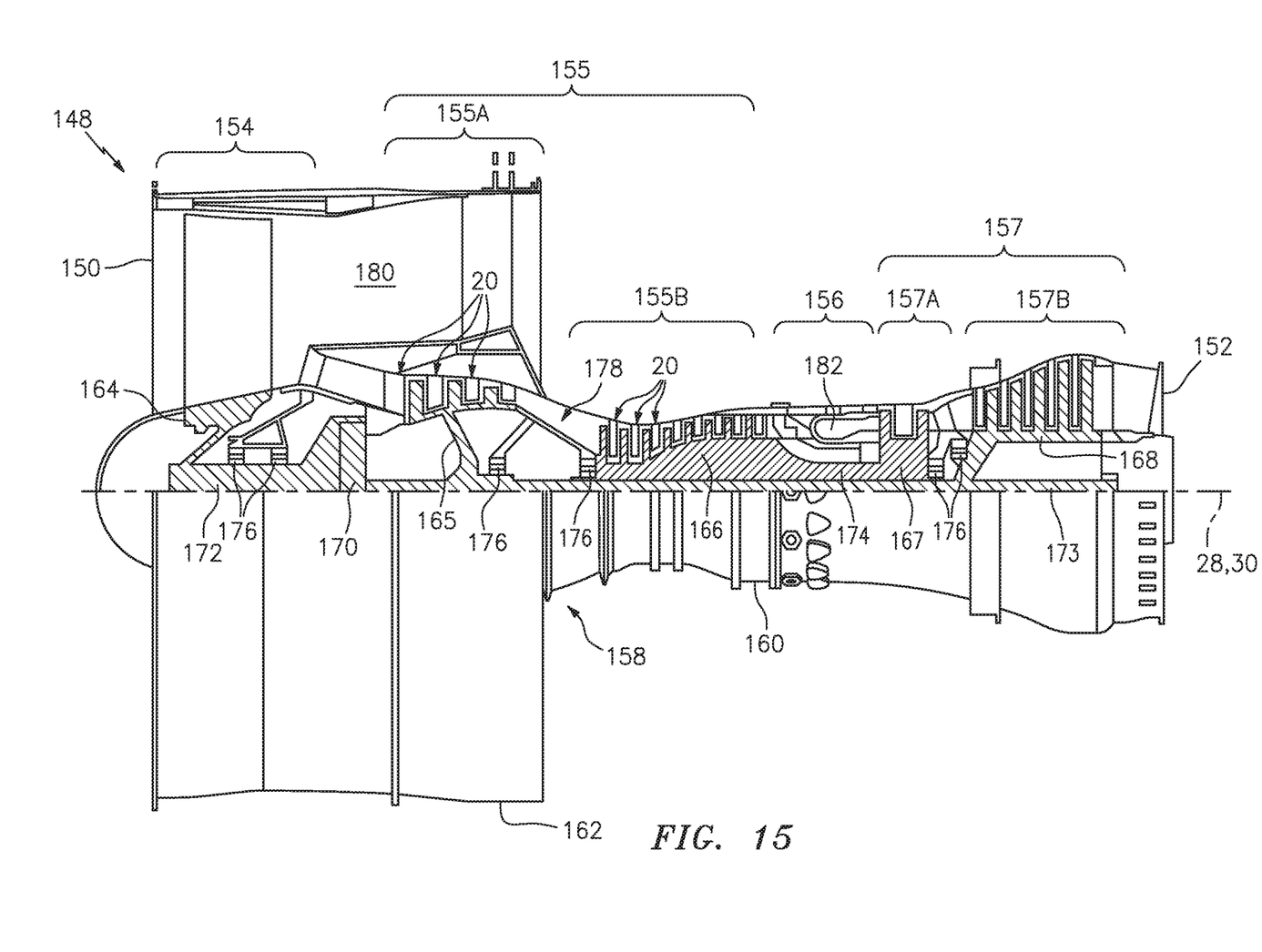
FIG. 15 is a side cutaway illustration of a turbine engine such as a geared turbofan engine.

FIG. 15 is a side cutaway illustration of a geared turbine engine 148 which may include the variable vane arrangement 20. The turbine engine 148 of FIG. 15 extends along the axial centerline 30 between an upstream airflow inlet 150 and a downstream airflow exhaust 152. The turbine engine 148 includes a fan section 154, a compressor section 155, a combustor section 156 and a turbine section 157. The compressor section 155 includes a low pressure compressor (LPC) section 155A and a high pressure compressor (HPC) section 155B. The turbine section 157 includes a high pressure turbine (HPT) section 157A and a low pressure turbine (LPT) section 157B.

The engine sections 154-157 are arranged sequentially along the centerline 30 within an engine housing 158. This housing 158 includes an inner case 160 (e.g., a core case) and an outer case 162 (e.g., a fan case). The inner case 160 may house one or more of the engine sections 155A-157B; e.g., an engine core. The outer case 162 may house at least the fan section 154.

Each of the engine sections 154, 155A, 155B, 157A and 157B includes a respective rotor 164-168. Each of these rotors 164-168 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 164 is connected to a gear train 170, for example, through a fan shaft 172. The gear train 170 and the LPC rotor 165 are connected to and driven by the LPT rotor 168 through a low speed shaft 173. The HPC rotor 166 is connected to and driven by the HPT rotor 167 through a high speed shaft 174. The shafts 172-174 are rotatably supported by a plurality of bearings 176; e.g., rolling element and/or thrust bearings. Each of these bearings 176 is connected to the engine housing 158 by at least one stationary structure such as, for example, an annular support strut.

During operation, air enters the turbine engine 148 through the airflow inlet 150. This air is directed through the fan section 154 and into a core gas path 178 and a bypass gas path 180. The core gas path 178 extends sequentially through the engine sections 155-157. The air within the core gas path 178 may be referred to as "core air". The bypass gas path 180 extends through a bypass duct, which bypasses the engine core. The air within the bypass gas path 180 may be referred to as "bypass air".

The core air is compressed by the compressor rotors 165 and 166 and directed into a combustion chamber 182 of a combustor in the combustor section 156. Fuel is injected into the combustion chamber 182 and mixed with the compressed core air to provide a fuel-air mixture. This fuel air mixture is ignited and combustion products thereof flow through and sequentially cause the turbine rotors 167 and 168 to rotate. The rotation of the turbine rotors 167 and 168 respectively drive rotation of the compressor rotors 166 and 165 and, thus, compression of the air received from a core airflow inlet. The rotation of the turbine rotor 168 also drives rotation of the fan rotor 164, which propels bypass air through and out of the bypass gas path 180. The propulsion of the bypass air may account for a majority of thrust generated by the turbine engine 148, e.g., more than seventy-five percent (75%) of engine thrust. The turbine engine 148 of the present disclosure, however, is not limited to the foregoing exemplary thrust ratio.

The variable vane arrangement 20 may be included in various turbine engines other than the one described above. The variable vane arrangement 20, for example, may be included in a geared turbine engine where a gear train connects one or more shafts to one or more rotors in a fan section, a compressor section and/or any other engine section. Alternatively, the variable vane arrangement 20 may be included in a turbine engine configured without a gear train. The variable vane arrangement 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a variable vane arrangement of a turbine engine, the assembly comprising:
    a platform extending circumferentially about an axial centerline and radially relative to the axial centerline between a first platform side and a second platform side, the platform including a plurality of variable vane receptacles arranged in an annular array about the axial centerline, and the plurality of variable vane receptacles including a first variable vane receptacle;
    the first variable vane receptacle configured with a recess, a bore and a shelf, the recess extending longitudinally along a variable vane pivot axis into the platform from the first platform side to the shelf, and the bore extending longitudinally along the variable vane pivot axis into the platform from the shelf; and
    an insert including a sleeve, a plate and a rim, the sleeve lining at least a portion of the bore, the plate located within the recess adjacent the shelf, the rim projecting longitudinally out from an outer peripheral edge of the plate along the variable vane pivot axis, and the rim extending circumferentially about the variable vane pivot axis between and to a circumferential first side surface of the rim and a circumferential second side surface of the rim.

2. The assembly of claim 1, wherein
    the platform includes a peripheral bore surface that at least partially forms the bore; and
    the insert is attached to the platform through an interference fit between the sleeve and the peripheral bore surface.

3. The assembly of claim 1, wherein the plate is an annular plate that extends circumferentially around the variable vane pivot axis.

4. The assembly of claim 1, wherein the plate covers substantially an entirety of the shelf.

5. The assembly of claim 1, wherein
    the first variable vane receptacle is further configured with a notch;
    the notch projects radially, relative to the variable vane pivot axis, out from the recess into the platform;
    the notch extends partially circumferentially about the variable vane pivot axis within the platform; and
    the rim is nested within the notch.

6. The assembly of claim 1, wherein
    the platform comprises a first material; and
    the insert comprises a second material that is different from the first material.

7. The assembly of claim 1, wherein
    the platform comprises a first material; and
    the insert comprises a second material that is identical to the first material.

8. The assembly of claim 1, wherein the first platform side is a radial inner side of the platform.

9. The assembly of claim 1, further comprising:
    a variable vane pivotable about the variable vane pivot axis;
    the variable vane including an airfoil, a hub and a shaft;
    the hub connected between the airfoil and the shaft and nested within the recess adjacent the plate; and
    the shaft projecting into the sleeve along the variable vane pivot axis.

10. A method involving a variable vane arrangement for a turbine engine, the variable vane arrangement including a platform and a variable vane, the method comprising:
    locating an insert in a receptacle of the platform, the insert including a sleeve, a plate and a rim, and the receptacle configured with a recess, a bore and a shelf; and
    attaching the insert to the platform using an interference fit between the sleeve and a surface of the bore;
    wherein the rim projects longitudinally out from an outer peripheral edge of the plate along a variable vane pivot axis, and the rim extends circumferentially about the variable vane pivot axis between and to a circumferential first side surface of the rim and a circumferential second side surface of the rim;
    wherein the sleeve lines at least a portion of the bore and is configured to receive a shaft of the variable vane; and
    wherein the plate is within the recess and is configured to provide a buffer between the shelf and a hub of the variable vane, and the plate covers substantially an entirety of the shelf.

11. An assembly for a variable vane arrangement of a turbine engine, the assembly comprising:
    a platform extending circumferentially about an axial centerline and radially relative to the axial centerline between a first platform side and a second platform side, the platform including a plurality of variable vane receptacles arranged in an annular array about the axial centerline, and the plurality of variable vane receptacles including a first variable vane receptacle;
    the first variable vane receptacle configured with a recess, a bore and a shelf, the recess extending longitudinally along a variable vane pivot axis into the platform from the first platform side to the shelf, and the bore extending longitudinally along the variable vane pivot axis into the platform from the shelf; and
    an insert including a sleeve, a plate and a rim, the sleeve lining at least a portion of the bore, and the plate located within the recess adjacent the shelf;
    wherein the platform includes a peripheral bore surface that at least partially forms the bore, and the insert is attached to the platform through an interference fit between the sleeve and the peripheral bore surface;
    wherein the rim projects longitudinally out from an outer peripheral edge of the plate along the variable vane pivot axis, and the rim extends circumferentially about the variable vane pivot axis between and to a circumferential first side surface of the rim and a circumferential second side surface of the rim; and
    wherein the plate covers an entirety of the shelf.

* * * * *